United States Patent [19]
Lehman

[11] 3,852,081

[45] Dec. 3, 1974

[54] CEMENT COMPOSITIONS CONTAINING ALPHA GYPSUM HAVING IMPROVED LONG-TERM DURABILITY

[75] Inventor: Carl Theodore Lehman, Arlington Heights, Ill.

[73] Assignee: United States Gypsum Company, Chicago, Ill.

[22] Filed: July 30, 1973

[21] Appl. No.: 383,745

[52] U.S. Cl. .................. 106/89, 106/90, 106/97, 106/110, 106/111
[51] Int. Cl. .................. C04b 7/02, C04b 11/12
[58] Field of Search .......... 106/89, 90, 97, 110, 111

[56] References Cited
UNITED STATES PATENTS
3,582,376   6/1971   Ames ................................... 106/90

*Primary Examiner*—J. Poer
*Attorney, Agent, or Firm*—Kenneth E. Roberts; Stanton T. Hadley; Samuel Kurlandsky

[57] ABSTRACT

Cementitious mixtures of alpha calcium sulfate hemihydrate, a portland cement and a dispersing agent are provided with improved long-term durability by the use of particular portland cements which are very low in tricalcium aluminate content.

10 Claims, No Drawings

CEMENT COMPOSITIONS CONTAINING ALPHA GYPSUM HAVING IMPROVED LONG-TERM DURABILITY

BACKGROUND OF THE INVENTION

This invention concerns improvements in quick-setting, high-strength cementitious compositions of the type containing, as major ingredients, alpha calcium sulfate hemihydrate and a portland cement, along with minor quantities of a fluidizing agent, or dispersant. More particularly, this invention is concerned with improving such compositions by providing them with long-term durability.

For some time now, products have been available which constitute combinations of Type I portland cement and alpha calcium sulfate hemihydrate (commonly called alpha gypsum) along with a dispersing agent. Such materials are disclosed in detail in the Ames U.S. Pat. No. 3,582,376. While that patent would seem on first reading to refer to "portland cements" generally, it is apparent that from the specific examples and from the performance of the material that that patent, along with present commercial endeavors, are concerned solely with a Type I material as the portland cement ingredient. For some time prior to that patent, and consistently subsequent to that patent, various endeavors concerned with these materials have consistently utilized a Type I portland cement. Of course one of the reasons for the concern with Type I portland cement has been its economy and commercial availability. General purpose portland cements which includes Types I and III portland cement constitute about 93 percent of the average annual total portland cement production, and this is further significant in that there are at least three other types of portland cement according to ASTM definitions. Type I is the standard for most construction purposes and is virtually the only type employed for highway construction and repair and the construction and repair of airport landing strips and the like.

Even though considerable time has passed and considerable efforts exerted for the improvement of these portland cement-alpha gypsum compositions, the formulations remain the same and they continue to suffer from serious deficiencies in durability over long periods of time, especially when subjected to frequent or continuous contact with moisture. Long-term exposure to moisture generally results in both a loss of strength and a subsequent growth or expansion of the set material. The latter defect is the much more serious because in extreme cases the expansion is so great as to cause a cracking and even complete crumbling and destruction of the aged set mass.

It has generally been acknowledged that the gypsum ingredient is the probable culprit for this long-term deterioration. While theories have been propounded on the actual reaction mechanisms involved, it has not heretofore been possible to propose or find solutions to the deterioration problem. The general suspicion of the alpha gypsum has been quite simplistic in that this is a non-hydraulic material whereas the other major constituent, the Type I portland cement, is a hydraulic material, that is a cement which hardens by reacting with water and gives a generally water-resistant product.

Thus while these cementitious materials have been accepted in the marketplace due to the quick-setting property, it has been commonly recognized that they are only a temporary material suffering severe detriments to long-term durability usages. These materials have been around for some time now and still in all commercial instances to the best of present knowledge, the portland ingredient is commonly confined to Type I material. It is readily apparent that no one has heretofore yet fully recognized and altered the precise reaction mechanisms to present any successful solutions to the long term deterioration problems.

SUMMARY OF THE INVENTION

The principal object and advantage of the present invention is the provision of improved alpha gypsum-portland cement cementitious compositions which exhibit long-term durability under severe weathering and exposure conditions.

A further object is to provide alpha gypsum-portland cement cementitious compositions of improved long-term durability which may be safely used under moist conditions.

Still another object is to provide alpha gypsum-portland cement compositions of improved long-term durability which may be utilized in permanent installations where they will be exposed continually to moist conditions, such as in below grade installations.

Still another object is the provision of alpha gypsum-portland cement compositions which are stabilized against undergoing, after setting, substantial expansion such as heretofore have caused cracking and even complete disintegration of the cementitious mass.

A still further object is the provision of alpha gypsum-portland cement compositions which are stabilized and resistant to physical and chemical deterioration through repeated freeze-thaw cycles.

The fulfillment of these and other objects and advantages of the present invention are accomplished by using a portland cement having very limited tricalcium aluminate content, such as those commonly known as Type IV and Type V portland cements. This invention resulted from the discovery of what was causing the long-term deteriorations of the set cementitious masses. Surprisingly, it was found that in the set samples of commercially available cementitious masses which were kept moist or wet, the tricalcium aluminate ($C_3A$) in the portland cement slowly reacted with the sulfate in the gypsum to form ettringite. The ettringite, as it formed, caused an increase in the volume or length of the set cement; and this delayed expansion caused the reduced strength, cracking and splitting, and even crumbling of the hardened cementitious mass. In the cementitious materials, the alpha calcium sulfate hemihydrate, when mixed with water, converts to a calcium sulfate dihydrate. The use of portland cement with very low $C_3A$ content for greater sulfate resistance produces a significant lowering of the rate of growth on exposure to moisture and thus provides a set cement exhibiting long-term durability under severe weathering and exposure conditions and resistant to substantial expansion, cracking or disintegration. The previous cements using Type I portland cement could not achieve these results.

The portland cement ingredient is one quite low in aluminate content, i.e., preferably not more than about 7 percent tricalcium aluminate by weight, and an especially desired material will not exceed about 5 percent by weight and further preferably the calculation for the amount of tetracalcium aluminoferrite content plus twice the amount of tricalcium aluminate content should not exceed about 20 percent by weight. Such portland cements are commercially available and commonly known as Type V as defined by American Society for Testing Materials (ASTM) Standard Specification ASTM C–150 and British Standard Specification for Portland Cement BSS12:1958.

Type V material is listed in literature published by the Portland Cement Association as "a special cement intended for use only in structures exposed to severe sulfate action," and it is stated in *The Durability of Concrete Construction* Woods, ACI Monograph No. 4; American Concrete Instiute — Iowa State University Press, 1968, on page 134 that "as the attack by sulfate solution involves primarily the formation of ettringite from tricalcium aluminate hydrate, an important increase in resistance can be had by use of cement with a limited amount of $C_3A$." This is also stated in *The Technology of Cement and Concrete*, Vol. 1; pages 24 and 26 by Blanks and Kinnedy; Wiley and Sons, 1955, in that briefly from the point of view of durability, reduced $C_3A$ content markedly improves resistance of concrete to the corrosive attack of sulfates and alkalis. In these reference works, concern is had with ground water becoming saturated with soluble sulfates picked up from natural sulfate deposits. In contrast thereto, the cementitious masses of concern in the present invention are composed of about half and more of the dry weight basis materials being a soluble sulfate. In consideration of this, it is considered highly unexpected that a mere lowering of the maximum amount of tricalcium aluminate available in the portland cement ingredient would provide the substantial and significant increased durability of the resultant cementitious mixtures.

In the cementitious masses of concern, it is conventional to use from about 5 to about 50 percent by weight on a dry weight basis of portland cement in the dry blend of the cementitious materials. In the present invention it has been found satisfactory to use the same proportions of portland cement having very low tricalcium aluminate content.

The alpha calcium sulfate hemihydrate ingredient is commercially available; and typical methods of producing it are disclosed in U.S. Pat. Nos. 1,901,051 and 3,423,172. The alpha calcium sulfate hemihydrate may be present in amounts, on a dry weight basis, of about 49 percent to about 94 percent.

Generally, the remaining ingredient is a dispersing agent or fluidizing agent, as is well known in the art, and such as is disclosed in U.S. Pat. No. 3,582,376. Any of the known fluidizing or dispersing agents for cementitious materials can be used in the practice of the present invention, such as the condensates of napthalene sulfonic acids and formaldehyde, offered by the Nopco Chemical Company of Newark, N.J. under the LOMAR brand, as well as sulfonated condensates of formaldehyde and napthalene; arabic gum and the like. The fluidizing agent is added in the customary amounts, generally about 0.5–0.8 percent by weight of the total dry mixture; although somewhat more or less may be used but without further substantial advantages.

This invention will now be further described by reference to specific examples for the purpose of further illustrating and disclosing the present invention, and the examples are in no way to be construed as limitations thereon.

EXAMPLE 1

A neat cementitious mixture was formulated by dry blending by weight about 49 percent of alpha calcium sulfate hemihydrate; about 49 percent of one of two portland cements; and about 0.5–0.75 percent of a condensate of napthalene sulfonic acids and formaldehyde dispersing agent. One of the portland cement ingredients used was a Type I portland cement that contained about 9.47 percent tricalcium aluminate. The second portland cement was a Type V portland cement, the tricalcium aluminate content of which was 3.82 percent and the tricalcium aluminoferrite plus twice the amount of tricalcium aluminate content did not exceed 20 percent. Aliquots of the cementitious blend were evaluated in the neat form; and other aliquots of the blend were mixed with sand as an aggregate (one part by weight of cementitious blend to 2 parts by weight of sand). Prisms measuring two inches by two inches by ten inches were cast using the various formulations and either about 26 percent or about 40 percent water, be weight basis of the cementitious blend present, the amount of water being increased when aggregate was present. The prisms were used for determination of length changes by placing the prisms in complete submersion under water starting about one hour after the cementitious blends were set. Water addition was maintained and the samples were evaluated for one year, with the length change results as set forth in Table 1.

Table 1

| Formulation | Elapsed Time | % Increased Length |
|---|---|---|
| Type I - neat | 7 days | 0.11 |
|  | 28 days | 0.23 |
|  | 3 months | 0.48 |
|  | 6 months | 0.85 |
|  | 9 months | 1.28 |
|  | 12 months | 1.65 |
| Type V - neat | 7 days | 0.11 |
|  | 28 days | 0.17 |
|  | 3 months | 0.17 |
|  | 6 months | 0.30 |
|  | 9 months | 0.37 |
|  | 12 months | 0.43 |
| Type I - sand | 7 days | 0.05 |
|  | 28 days | 0.10 |
|  | 3 months | 0.22 |
|  | 6 months | 0.51 |
|  | 9 months | 1.05 |
|  | 12 months | 2.35 |
| Type V - sand | 7 days | 0.03 |
|  | 28 days | 0.05 |
|  | 3 months | 0.06 |
|  | 6 months | 0.09 |
|  | 9 months | 0.11 |
|  | 12 months | 0.12 |

As ettringite forms in the set cement, it causes an increase in the volume or length of the 2 inches × 2 inches × 10 inches prisms. The formulation using the Type I portland cement through all monthly measurements continued to have a much greater increase in length change than did those formulations made with the Type V cement, as clearly seen in Table 1. Those specimens containing aggregate and made with Type I cement have almost failed after 12 months. It was observed that by 15 months most of the aggregated Type I specimens had so deteriorated that they fell apart when picked up. The neat cast formulation with Type I portland cement had not yet failed at the end of 12 months showing at that time some surface cracking, indicative that failure of the prism had started.

EXAMPLE 2

Aliquots of neat and aggregated cementitious blends as set forth in Example 1 were evaluated for compressive strength over a one year elapse of time. For this evaluation, cylinders measuring three inches by six inches were cast using the various formulations, and the cast specimens were placed in total water immersion about 1 hour after the cementitious blend set. Water addition was maintained and the samples evaluated for 1 year. Only a limited evaluation of compressive strength was made in that it was determined whether or not strength was greater than 8,500 psi and measurements were taken for strengths below that figure. Typical results are set forth in Table 2.

Table 2

| Formulation | Elapsed Time | Compressive Strength (p.s.i.) |
| --- | --- | --- |
| Type I - neat | 1 hour | 1500 |
| | 3 days | 5100 |
| | 7 days | 6000 |
| | 28 days | 6400 |
| | 6 months | 8500 |
| | 12 months | 8500 |
| Type V - neat | 1 hour | 1500 |
| | 3 days | 4050 |
| | 7 days | 4600 |
| | 28 days | 5650 |
| | 6 months | 8100 |
| | 12 months | 8500 |
| Type I - sand | 1 hour | 600 |
| | 3 days | 2300 |
| | 7 days | 2550 |
| | 28 days | 3150 |
| | 6 months | 3500 |
| | 12 months | 1150 |
| Type V - sand | 1 hour | 650 |
| | 3 days | 1950 |
| | 7 days | 2250 |
| | 28 days | 2500 |
| | 6 months | 3950 |
| | 12 months | 4350 |

As seen from Table 2, at six months of age all of the neat specimens but one had strength greater than 8,500 pounds per square inch. At twelve months of age, all neat specimens had strengths greater than 8,500 psi. However, in the aggregated formulations made with Type I portland cement, failure by loss of strength was imminent at 1 year, while the formulations with Type V cement had an increase in strength at 1 year.

EXAMPLE 3

Aliquots of neat and aggregated cementitious blends as set forth in Example 1 were cast as prisms measuring 2 inches × 2 inches × 10 inches and evaluated for weight gain over a time elapse of 1 year. The weight gain measurement is indicative of new compounds being formed in the set cement which compounds hold a lot of water, i.e., ettringite. There is a definite correlation between weight gain to strength loss and expansion due to the ettringite formation. Again the prisms were totally immersed in water; and water addition was maintained during a one year evaluation. Typical results are set forth in Table 3.

Table 3

| Formulation | Elapsed Time | % Weight Gain |
| --- | --- | --- |
| Type I - neat | 1 hour | 1.0 |
| | 3 days | 2.0 |
| | 7 days | 2.2 |
| | 28 days | 2.7 |
| | 3 months | 3.0 |
| | 6 months | 3.8 |
| | 9 months | 4.6 |
| | 12 months | 5.2 |
| Type V - neat | 1 hour | 1.0 |
| | 3 days | 2.0 |
| | 7 days | 2.2 |
| | 28 days | 2.6 |
| | 3 months | 2.9 |
| | 6 months | 3.2 |
| | 9 months | 4.0 |
| | 12 months | 4.8 |
| Type I - sand | 1 hour | 0.4 |
| | 3 days | 0.9 |
| | 7 days | 0.9 |
| | 28 days | 1.5 |
| | 3 months | 1.6 |
| | 6 months | 2.2 |
| | 9 months | 3.0 |
| | 12 months | 5.2 |
| Type V - sand | 1 hour | 0.4 |
| | 3 days | 0.9 |
| | 7 days | 1.0 |
| | 28 days | 1.1 |
| | 3 months | 1.3 |
| | 6 months | 1.4 |
| | 9 months | 1.5 |
| | 12 months | 1.7 |

EXAMPLE 4

Aliquots of neat and aggregated blends as set forth in Example 1 were evaluated for exterior durability by a below grade casting of slabs that measure 13 inches by 13 inches by 3 inches onto ground over a gravel base. The ground location was in a northern midwestern area that is subject to frequent flooding, particularly in the spring months; to direct sun exposure in the summer months; and to extreme temperatures and freezing during the winter months, with frequent freeze-thaw cycles at the end of the winter. All of the specimens using Type I portland cement had severely cracked and/or seriously expanded within 12 to 14 months exposure. Most of the Type I portland cement specimens in that time had turned from a hard set cement to a mushy material that could be picked up, was easily crumbled and that resembled oatmeal. Further most of these samples had expanded above grade. One of these specimens had failed within five months due to severe spring weather with frequent freeze-thawing cycles. In comparison, specimens using Type V portland cement cast in the same way and using the same water content had lasted 21 months without any evidence of failure, and from observation it is expected that they will last for at least another six months through winter and spring freeze-thawing cycles without failure.

While the present invention has been described and exemplified with respect to certain specific embodiments, it is not to be considered limited thereto; and it is to be understood that modifications and variations thereof, obvious to those skilled in the art, may be made without departing from the spirit or scope thereof. For example, as is well known in the art, the use consistency of mixing the dry cementitious blends with water may vary widely, particularly dependent upon the quantities and types of added aggregate. Further, known additives may be included in customary amounts to modify various properties of the cementitious material. Thus, air entraining agents, foam control agents, fillers and various aggregates, and the like may be incorporated. In some instances it may be desired that a minor proportion of either a calcium sulfate hemihydrate or a portland cement accelerator or retarder, or mixtures thereof, be present in order to vary the setting time of the cementitious mass. Similarly, any dispersing or fluidizing agent for calcium sulfate hemihydrate or portland cements may be used in place of the ones specified hereinabove with substantially equivalent results; and the amount of such dispersing agent may vary widely depending on the particular one used.

What is claimed is:

1. A cement composition which when set is resistant to subsequent deterioration by substantial expansion, weight gain, and loss of compressive strength comprising a mixture of, by weight, about 49–94 percent of alpha calcium sulfate hemihydrate; about 49–5 percent of a portland cement containing not more than about 7 percent by weight tricalcium aluminate; and about 0.5–0.8 percent of a dispersing agent.

2. The cement composition of claim 1 in which the amount of tetracalcium aluminoferrite plus twice the amount of tricalcium aluminate content of the portland cement does not exceed about 20 percent by weight.

3. The cement composition of claim 1 in which the portland cement is a Type V cement.

4. The cement composition of claim 1 containing, by weight, about 49 percent of alpha calcium sulfate hemihydrate; about 49 percent of a portland cement having not more than about 5 percent tricalcium aluminate content; and about 0.5–0.8 percent of dispersing agent.

5. A settable, plastic mass comprising an aqueous slurry of the composition of claim 1.

6. A process for imparting long-term durability, to alpha calcium sulfate hemihydrate-portland cement compositions that contain minor amounts of a dispersing agent, and resistance to subsequent expansion, weight gain and loss of compressive strength of the set cement, comprising the step of incorporating portland cements which are very low in tricalcium aluminate content.

7. The process of claim 6 in which the portland cement contains not more than about 7 percent by weight of tricalcium aluminate.

8. The process of claim 6 in which the portland cement contains not more than about 5 percent by weight of tricalcium aluminate.

9. The process of claim 6 in which the amount of tetracalcium aluminoferrite content plus twice the amount of tricalcium aluminate content of the portland cement does not exceed about 20 percent by weight.

10. The process of claim 6 in which the portland cement is Type V portland cement.

* * * * *